United States Patent
Jang et al.

(10) Patent No.: US 10,433,216 B2
(45) Date of Patent: *Oct. 1, 2019

(54) METHOD AND APPARATUS FOR SELECTING NETWORK AND DISTRIBUTING TRAFFIC IN HETEROGENEOUS COMMUNICATION ENVIRONMENT

(71) Applicant: Samsung Electronics Co., Ltd., Suwon-si, Gyeonggi-do (KR)

(72) Inventors: Jaehyuk Jang, Suwon-si (KR); Gert Jan Van Lieshout, Middlesex (GB); Sangbum Kim, Suwon-si (KR); Soenghun Kim, Suwon-si (KR); Wooseong Kim, Gwacheon-si (KR); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

This patent is subject to a terminal disclaimer.

(21) Appl. No.: 14/872,589

(22) Filed: Oct. 1, 2015

(65) Prior Publication Data

US 2016/0029263 A1  Jan. 28, 2016

Related U.S. Application Data

(63) Continuation of application No. 14/760,588, filed as application No. PCT/KR2014/007169 on Aug. 4, 2014.

(30) Foreign Application Priority Data

Aug. 2, 2013  (KR) .................. 10-2013-0092156

(51) Int. Cl.
*H04W 36/08* (2009.01)
*H04W 36/00* (2009.01)
(Continued)

(52) U.S. Cl.
CPC ......... *H04W 36/0061* (2013.01); *H04L 12/18* (2013.01); *H04W 24/02* (2013.01);
(Continued)

(58) Field of Classification Search
CPC ............. H04W 36/08; H04W 36/0066; H04W 36/046; H04W 36/0061; H04W 36/22;
(Continued)

(56) References Cited

U.S. PATENT DOCUMENTS

2010/0093350 A1*  4/2010  Wang ................... H04W 36/08
                                                                 455/436
2012/0263145 A1   10/2012  Marinnier et al.
(Continued)

FOREIGN PATENT DOCUMENTS

CN        102448142 A     5/2012
KR    10-2004-0025352 A   3/2004
(Continued)

OTHER PUBLICATIONS

CMCC, Discussion on Network Selection Solutions, 3GPP TSG-RAN WG2 Meeting #82, R2-131852, May 10, 2013, Fukuoka, Japan.

(Continued)

*Primary Examiner* — Harun Chowdhury
(74) *Attorney, Agent, or Firm* — Jefferson IP Law, LLP

(57) ABSTRACT

According to an embodiment, a method for selecting an access network at user equipment in a mobile communication system includes step of receiving, from a base station, first setting information, and step of selecting the access network based on second setting information if the second setting information is received from the base station, or selecting the access network based on the first setting information if no second setting information is received. Using the proposed method, the user equipment can reduce (Continued)

user's inconvenience and save battery by blocking unnecessary offloading and wireless LAN scanning, and also can improve the quality of use and immediately respond to a cell change by preventing a ping-pong phenomenon.

10 Claims, 13 Drawing Sheets

(51) Int. Cl.

| | | |
|---|---|---|
| *H04W 72/04* | (2009.01) | |
| *H04W 24/02* | (2009.01) | |
| *H04W 48/18* | (2009.01) | |
| *H04W 28/08* | (2009.01) | |
| *H04L 12/18* | (2006.01) | |
| *H04W 36/36* | (2009.01) | |
| *H04W 88/06* | (2009.01) | |
| *H04W 88/08* | (2009.01) | |
| *H04W 36/14* | (2009.01) | |
| *H04W 36/22* | (2009.01) | |
| *H04W 84/04* | (2009.01) | |
| *H04W 84/12* | (2009.01) | |
| *H04W 48/14* | (2009.01) | |

(52) U.S. Cl.
CPC ....... *H04W 28/08* (2013.01); *H04W 36/0066* (2013.01); *H04W 36/08* (2013.01); *H04W 36/36* (2013.01); *H04W 48/18* (2013.01); *H04W 72/0486* (2013.01); *H04W 36/0083* (2013.01); *H04W 36/14* (2013.01); *H04W 36/22* (2013.01); *H04W 48/14* (2013.01); *H04W 84/042* (2013.01); *H04W 84/12* (2013.01); *H04W 88/06* (2013.01); *H04W 88/08* (2013.01); *Y02D 70/00* (2018.01); *Y02D 70/1242* (2018.01); *Y02D 70/1262* (2018.01); *Y02D 70/142* (2018.01); *Y02D 70/164* (2018.01); *Y02D 70/23* (2018.01); *Y02D 70/24* (2018.01)

(58) Field of Classification Search
CPC .......... H04W 72/0486; H04W 76/046; H04W 76/27; H04W 84/12
USPC ...................... 370/230.1, 329, 331, 332, 235
See application file for complete search history.

(56) References Cited

U.S. PATENT DOCUMENTS

| | | | |
|---|---|---|---|
| 2014/0211776 A1 | 7/2014 | Jang et al. | |
| 2016/0044550 A1* | 2/2016 | Lee ................... | H04W 36/0066 370/331 |
| 2016/0080998 A1* | 3/2016 | Fukuta .................. | H04W 36/22 370/331 |

FOREIGN PATENT DOCUMENTS

| | | |
|---|---|---|
| KR | 10-2004-0083851 A | 10/2004 |
| KR | 10-2012-0049555 A | 5/2012 |
| KR | 10-2012-0067621 A | 6/2012 |
| KR | 10-2014-0096631 A | 8/2014 |
| WO | 2009/045078 A2 | 4/2009 |
| WO | 2010/017012 A1 | 2/2010 |
| WO | 2012/142436 A1 | 10/2012 |

OTHER PUBLICATIONS

European Office Action dated Feb. 1, 2018, issued in the European patent application No. 14 832 997.2.
Chinese Office Action dated Sep. 17, 2018, issued in Chinese Application No. 201480009751.8.
Chinese Office Action dated Jun. 12, 2019, issued in a counterpart Chinese application No. 201480009751.8.

* cited by examiner

METHOD AND APPARATUS FOR SELECTING NETWORK AND DISTRIBUTING TRAFFIC IN HETEROGENEOUS COMMUNICATION ENVIRONMENT

CROSS-REFERENCE TO RELATED APPLICATION(S)

This application is a continuation application of prior application Ser. No. 14/760,588, filed on Jul. 13, 2015 which claimed the benefit under 35.U.S.C. § 371 of an International application filed on Aug. 4, 2014 and assigned application number PCT/KR2014/007169, which claims the benefit of a Korean patent application filed on Aug. 2, 2013 in the Korean Intellectual Property Office and assigned the serial number 10-2013-0092156, the entire disclosure of each of which is hereby incorporated by reference.

BACKGROUND OF THE INVENTION

Technical Field

The present invention relates to a wireless communication system and also relates to a method and apparatus for a network selection and traffic distribution in a heterogeneous communication environment. More particularly, the present invention relates to a method for selecting a network depending on a moving velocity at user equipment (UE) and a method for preventing a ping-pong phenomenon when the UE receives offload related message from a base station in 3GPP (The 3rd Generation Partnership Project) system, e.g., UMTS (Universal Mobile Telecommunications System), LTE (Long Term Evolution) system, etc., interworking with a wireless LAN (WLAN).

Description of Related Art

Recently wireless communication technologies have made great advances and thus communication system technologies have also evolved continuously. Among them, UMTS system is one of the 3-generation mobile communication technologies, and LTE system is getting the spotlight as the 4-generation mobile communication technology.

Additionally, the popularization of smart phones invites an exploding use of data, and mobile communication network operators are now trying to distribute users' data by combining WLAN network with the existing cellular network (i.e., 3G or 4G network) in order to cope with an explosion in data.

However, in case of blindly offloading UE staying in cellular network to WLAN network, rapid degradation in quality felt by a user may be caused. For example, if UE which is moving at a high speed passes near a WLAN access point (AP) and accesses it, the WLAN connection is cut off shortly and this causes inconvenience to a user. Further, since UE continuously discovers available WLAN in the neighborhood, a battery of UE may be consumed rapidly.

In addition, after moving to WLAN network, UE does not know a state of cellular network. Therefore, a solution for preventing UE from returning to cellular network at random is required.

SUMMARY OF THE INVENTION

Technical Problem

Embodiments disclosed herein are proposed to solve the above-discussed issues, and the present invention provides a solution for a network selection depending on a moving velocity at UE in case a cellular network (e.g., 3G network such as UMTS, 4G network such as LTE, etc.) interworks with a WLAN network (i.e., short range communication technology based on IEEE 802.11) in a wireless communication system, and a solution for returning to the cellular network when the UE receives a WLAN offload related message from a cellular base station.

Technical Solution

According to an embodiment disclosed herein, a method for selecting an access network at user equipment in a mobile communication system includes steps of receiving, from a base station, first setting information; and selecting the access network based on second setting information if the second setting information is received from the base station, or selecting the access network based on the first setting information if no second setting information is received.

According to another embodiment disclosed herein, a method for supporting a selection of an access network by user equipment at a base station in a mobile communication system includes steps of transmitting first setting information to the user equipment; and transmitting second setting information to the user equipment, wherein the user equipment selects the access network based on the second setting information if the second setting information is received, or selects the access network based on the first setting information if no second setting information is received.

According to still another embodiment disclosed herein, user equipment for selecting an access network in a mobile communication system includes a transceiver unit configured to transmit or receive a signal to or from a base station; and a control unit configured to control the transceiver unit, to receive first setting information from the base station, to select the access network based on second setting information if the second setting information is received from the base station, or to select the access network based on the first setting information if no second setting information is received.

According to yet another embodiment disclosed herein, a base station for supporting a selection of an access network by user equipment in a mobile communication system includes a transceiver unit configured to transmit or receive a signal to or from the user equipment; and a control unit configured to control the transceiver unit, to transmit first setting information to the user equipment, and to transmit second setting information to the user equipment, wherein the user equipment selects the access network based on the second setting information if the second setting information is received, or selects the access network based on the first setting information if no second setting information is received.

Advantageous Effects

By using the proposed method, the user equipment can reduce user's inconvenience and save battery by blocking unnecessary offloading and wireless LAN scanning, and also can improve the quality of use and immediately respond to a cell change by preventing a ping-pong phenomenon.

DETAILED DESCRIPTION OF EXEMPLARY EMBODIMENTS

Figure 1:
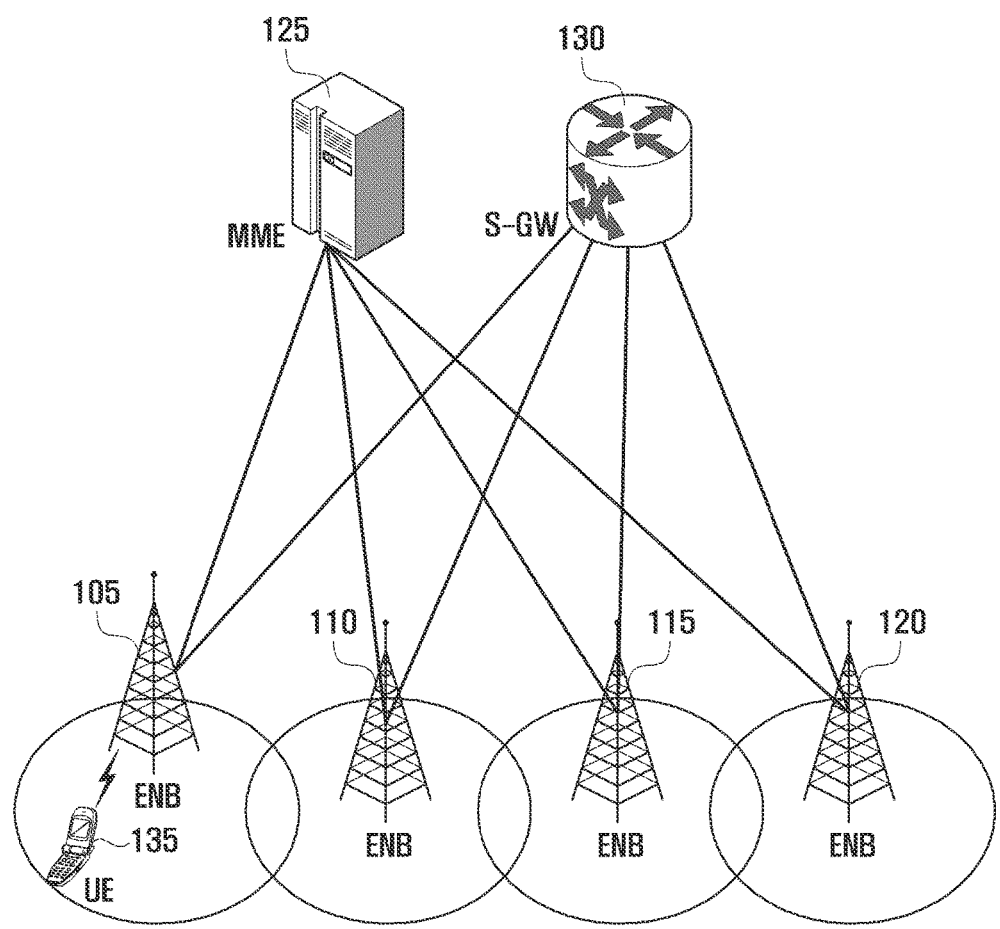
FIG. 1 is a diagram illustrating a structure of LTE system in accordance with an embodiment of this disclosure.

Hereinafter, the present disclosure will be described with reference to the accompanying drawings.

This disclosure may be embodied in many different forms and should not be construed as limited to the embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a Field Programmable Gate Array (FPGA) or Application Specific Integrated Circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Embodiments disclosed herein propose a method for restricting a network selection depending on a moving velocity at user equipment and a method for preventing a ping-pong phenomenon after the user equipment receives offload related message from a base station in case a mobile communication network (e.g., UMTS, LTE, etc.) interworks with a WLAN network in a wireless communication system. Through this invention, the user equipment can reduce user's inconvenience and save battery by blocking unnecessary offloading and WLAN scanning, and also can improve the quality of use and immediately respond to a cell change by preventing a ping-pong phenomenon.

Now, various embodiments of the present invention will be described with reference to the accompanying drawings.

According to an embodiment of this disclosure, the following scheme may be proposed in order to prevent the transfer of user equipment (UE), moving at a high speed, to WLAN.

In case UE supports an access network discovery and selection function (ANDSF), the UE receives an ANDSF policy proposed in this invention from an ANDSF server, determines whether to perform a WLAN network discovery (or scanning), and performs a network selection.

Depending on a policy value, UE performs no WLAN network discovery before selecting WLAN network, thus allowing a reduction in battery.

According to another embodiment of this disclosure, in case UE receives a message related to the transfer from ENB of cellular network to WLAN network, the following scheme may be proposed in order to prevent a ping-pong phenomenon that indicates a return to the WLAN network.

When a message related to the transfer to WLAN network is received from ENB of cellular network, a timer capable of determining the validity of the received message is started.

The timer may be defined as a fixed value in the specification or set by a message of a radio resource control (RRC) layer.

When UE moves to other cellular network or WLAN network during the operation of the timer, the following embodiment may be performed.

UE terminates the timer and determines again whether to perform the access to cellular network.

UE terminates the timer and reports a change in an access state of the UE to cellular network. Through the transmission of a reporting message, the UE may receive a command of an access return to cellular network from ENB.

UE may receive a command to maintain access with WLAN network from cellular network during the operation of the timer.

When such a command to maintain access with WLAN is received, UE resets the timer and performs a restart.

UE may receive a command to return to cellular network during the operation of the timer.

When such a command to return to cellular network, UE terminates the timer and tries to return to cellular network.

Although this invention is described by focusing on LTE system as one example of cellular network, it may be commonly applied to other cellular network (e.g., UMTS).

FIG. 1 is a diagram illustrating a structure of LTE system in accordance with an embodiment of this disclosure.

Referring to FIG. 1, as shown, a wireless access network of LTE system is formed of evolved node B (ENB, also referred to as node B or a base station) 105, 110, 115 and 120, a mobility management entity (MME) 125, and a serving-gateway (S-GW) 130. User equipment (UE, also referred to as a terminal or a user device) 135 accesses an external network through the ENB 105~120 and the S-GW 130.

The ENB 105~120 of FIG. 1 corresponds to typical node B of UMTS system. The ENB is connected with the UE 135 through a wireless channel and performs a more complicated role than typical node B. Since all user traffics including a real-time service such as a voice over internet protocol (VoIP) is serviced through a shared channel in LTE system, an apparatus that performs scheduling by collecting a buffer state of the UE, available transmission power state, a channel status, and the like is required. This is performed by the ENB 105~120. Normally one ENB controls a plurality of cells. For example, in order to realize a transmission speed of 100 Mbps, LTE system uses orthogonal frequency division multiplexing (OFDM) as wireless access technique at a bandwidth of 20 MHz. Also applied is an adaptive modulation and coding (AMC) scheme for determining a modulation scheme and a channel coding rate according to a channel status of the UE. The S-GW 130 is an apparatus for offering data bearer and creates or removes data bearer under the control of the MME 125. The MME is an apparatus for performing a mobility management function for the UE and various control functions and is connected with a plurality of ENBs.

Figure 2:
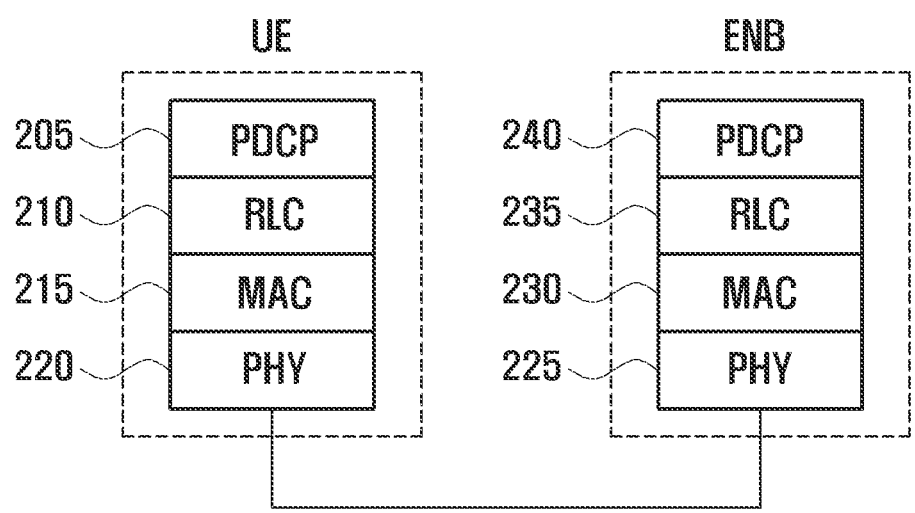
FIG. 2 is a diagram illustrating a wireless protocol structure in LTE system in accordance with an embodiment of this disclosure.

FIG. 2 is a diagram illustrating a wireless protocol structure in LTE system in accordance with an embodiment of this disclosure.

Referring to FIG. 2, in each of UE and ENB, a wireless protocol of LTE system is formed of a packet data convergence protocol (PDCP) 205 or 240, and a radio link control (RLC) 210 or 235, a medium access control (MAC) 215 or 230. The PDCP 205 or 240 performs IP header compression/decompression, and the RLC 210 or 235 reconfigures a packet data unit (PDU) with a suitable size. The MAC 215 or 230 is connected with various RLC layer devices formed in single UE and performs an operation of multiplexing RLC PDUs to MAC PDU and demultiplexing RLC PDUs from MAC PDU. A physical layer 220 or 225 creates OFDM symbols by channel-coding and modulating upper layer data and then transmits them to a wireless channel, or demodulates and channel-decodes OFDM symbols received through a wireless channel and then transfers them to an upper layer. Also, the physical layer uses hybrid ARQ (HARQ) for additional error correction, and a receiving end sends one bit indicating whether packet transmitted by a transmitting end is received or not. This is referred to as HARQ ACK/NACK information. Downlink HARQ ACK/NACK information regarding uplink transmission may be transmitted through a physical hybrid-ARQ indicator channel (PHICH), and uplink HARQ ACK/NACK information regarding downlink transmission may be transmitted through a physical uplink control channel (PUCCH) or a physical uplink shared channel (PUSCH).

Figure 3:
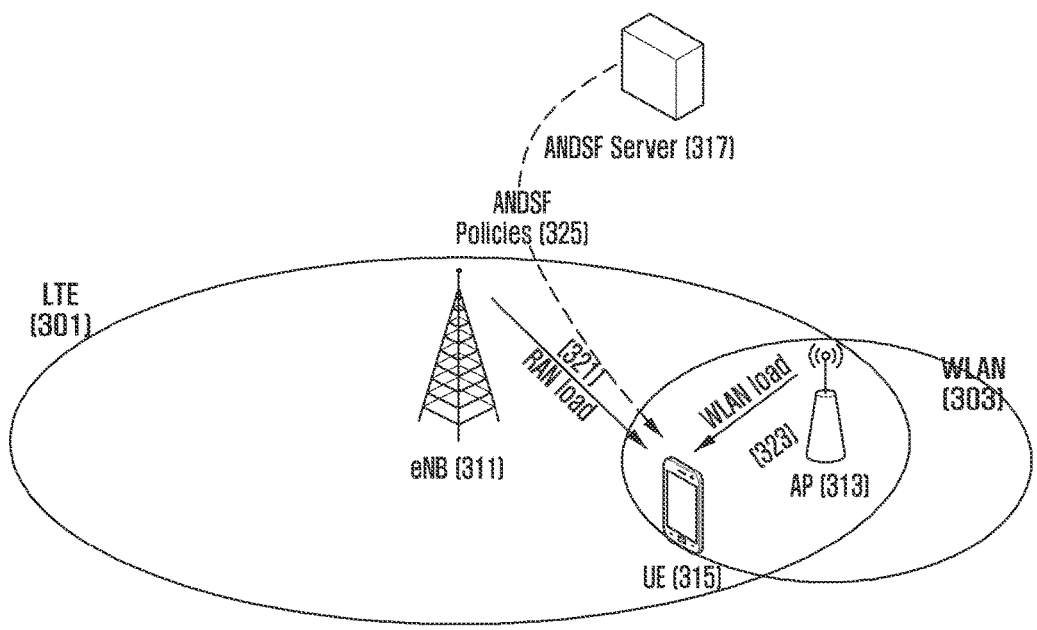
FIG. 3 is a diagram illustrating the first scenario of network interworking between 3GPP network and WLAN network in accordance with an embodiment of this disclosure.

FIG. 3 is a diagram illustrating the first scenario of network interworking between 3GPP network and WLAN network in accordance with an embodiment of this disclosure.

Referring to FIG. 3, in this scenario, UE 315 receives ANDSF policies 325 from an ANDSF server 317 and then selects an access network (i.e., 3GPP network and/or WLAN network).

The ANDSF policies 325 may include a policy to select only one of 3GPP network and WLAN network, and may include a policy to simultaneously access both 3GPP network and WLAN network. For example, according to a policy in case the UE 315 uses a voice over internet protocol (VoIP) service, VoIP packets are always offered through 3GPP network for a seamless service and the other internet packets may be offered through 3GPP network or WLAN network selected depending on circumstances.

The ANDSF policies 325 may have therein various conditions for selecting WLAN network and 3GPP network. For example, a selection of WLAN network may be restricted to an AP having a low load of WLAN.

For example, if the ANDSF policies 325 include a policy instructing that a WLAN AP having channel utilization of 50% or under has a higher access priority than that of 3GPP network, UE 315 finds a certain AP 313 through the discovery in neighboring WLAN network, receives the channel utilization of AP from the found AP 313 as indicated by a reference number 323, determines whether the condition is satisfied, and then determines whether to access the found AP.

In addition, if the ANDSF policies 325 include a policy instructing that in case 3GPP network has a high load, a WLAN AP having channel utilization of 50% or under has a higher access priority than that of 3GPP network, the UE 315 may receive load information 321 from the ENB 311 of 3GPP network, determine whether the condition is satisfied, and then determine whether to access the found AP. Such load information (RAN load) of 3GPP network may be transmitted via broadcast or unicast. In case of unicast transmission, this may be effective in forcing specific UE to offload. In case both broadcast and unicast are used together, if broadcast information indicates that a current load status is normal, and if unicast information tells specific UE that a current load status is high, the specific UE may try to access WLAN network according to the above condition.

In embodiments of this disclosure, any condition associated with a moving velocity of UE may be added as an additional condition to be used for selecting WLAN network and 3GPP network in the ANDSF policies 325. Namely, for example, if there is a condition associated with a moving velocity of the UE in the ANDSF policies 325, the UE 315 determines whether a current moving velocity is smaller than the condition, and then, in this case only, searches neighboring WLAN network. If any WLAN AP satisfying the condition is found, the UE 315 tries to access the found AP 313.

Figure 4:
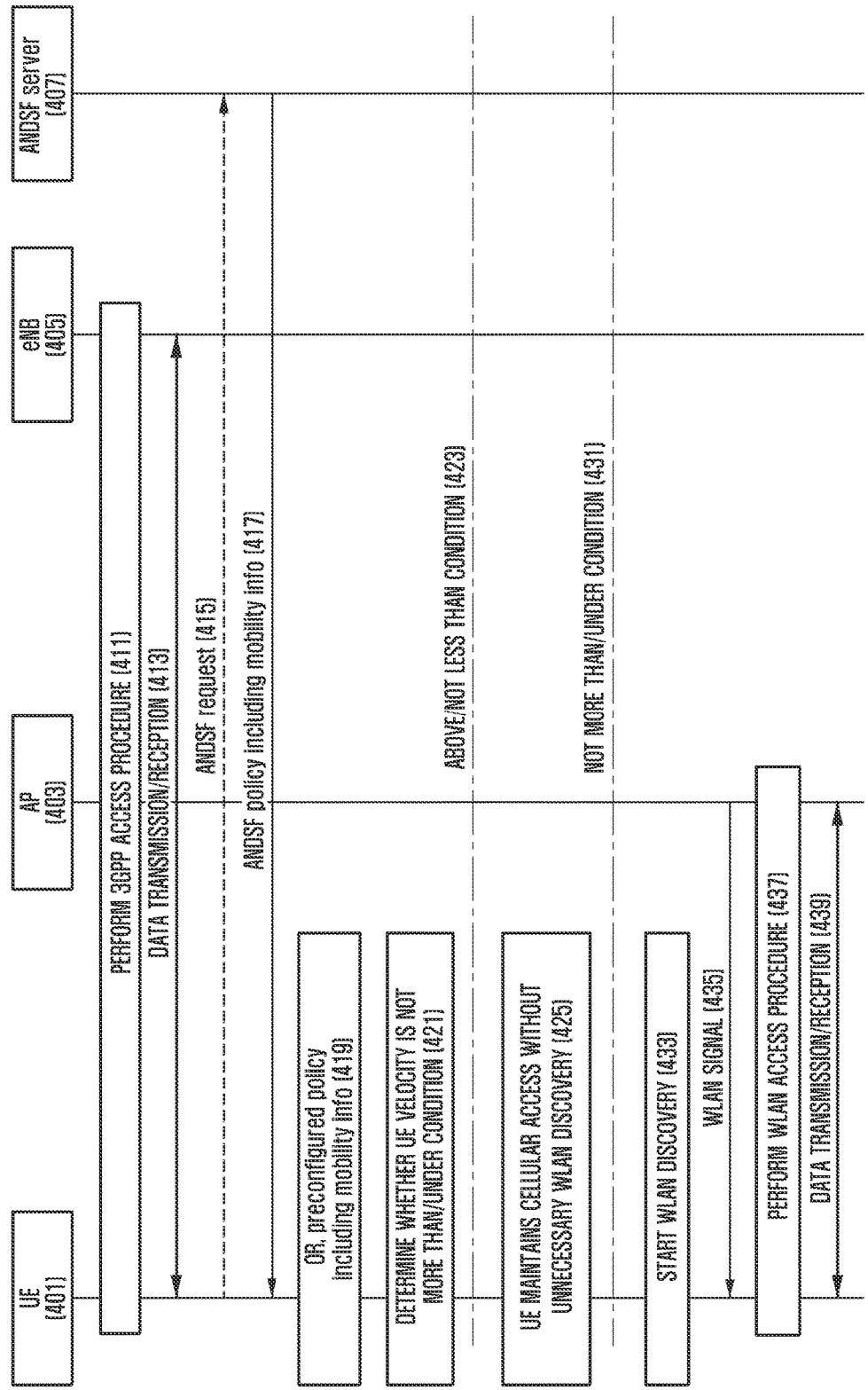
FIG. 4 is a diagram illustrating a message flow regarding a scheme of performing access to WLAN network depending on a moving velocity of user equipment in accordance with an embodiment of this disclosure.

FIG. 4 is a diagram illustrating a message flow regarding a scheme of performing access to WLAN network depending on a moving velocity of user equipment in accordance with an embodiment of this disclosure.

Referring to FIG. 4, at step 411, UE 401 performs a procedure for access to ENB 405 of 3GPP network and enters a state capable of transmitting or receiving data to or from 3GPP network.

Thereafter, at step 413, the UE 401 can transmit or receive data to or from 3GPP network through the ENB 405.

Meanwhile, in case there is an ANDSF function in the network, the UE 401 may transmit a message of requesting ANDSF related policies to an ANDSF server 407 at step 415. Then, at step 417, the ANDSF server 407 may transmit an ANDSF policy to the UE 401. Alternatively, in some embodiments, the ANDSF server 407 may transmit such an ANDSF policy to the UE 401 without a request of the UE 401.

If there is no ANDSF function in the network, there may be a preconfigured ANDSF policy in the UE 401 as shown at step 419.

This ANDSF policy may include UE mobility information proposed in embodiments of this disclosure. Examples of such mobility information are as follows.

Mobility State Estimation (MSE): A mobility state may be determined as normal/medium/high according to the count of handover/cell reselection of UE during a given time period ($T_{CRmax}$). For example, an MSE value of UE is not more than/under normal, not more than/under medium, or not more than/under high.

If the count of handover/cell reselection of UE during a given time period exceeds $N_{CR\_H}$, mobility is regarded as 'high'.

If the count of handover/cell reselection of UE during a given time period exceeds $N_{CR\_M}$ and fails to exceed $N_{CR\_H}$, mobility is regarded as 'medium'.

In the other case, mobility is regarded as 'normal'.

Moving Velocity Value of UE: A moving velocity of UE (e.g., not more than/under×km/h) is measured using GPS or the like.

Figure 5:
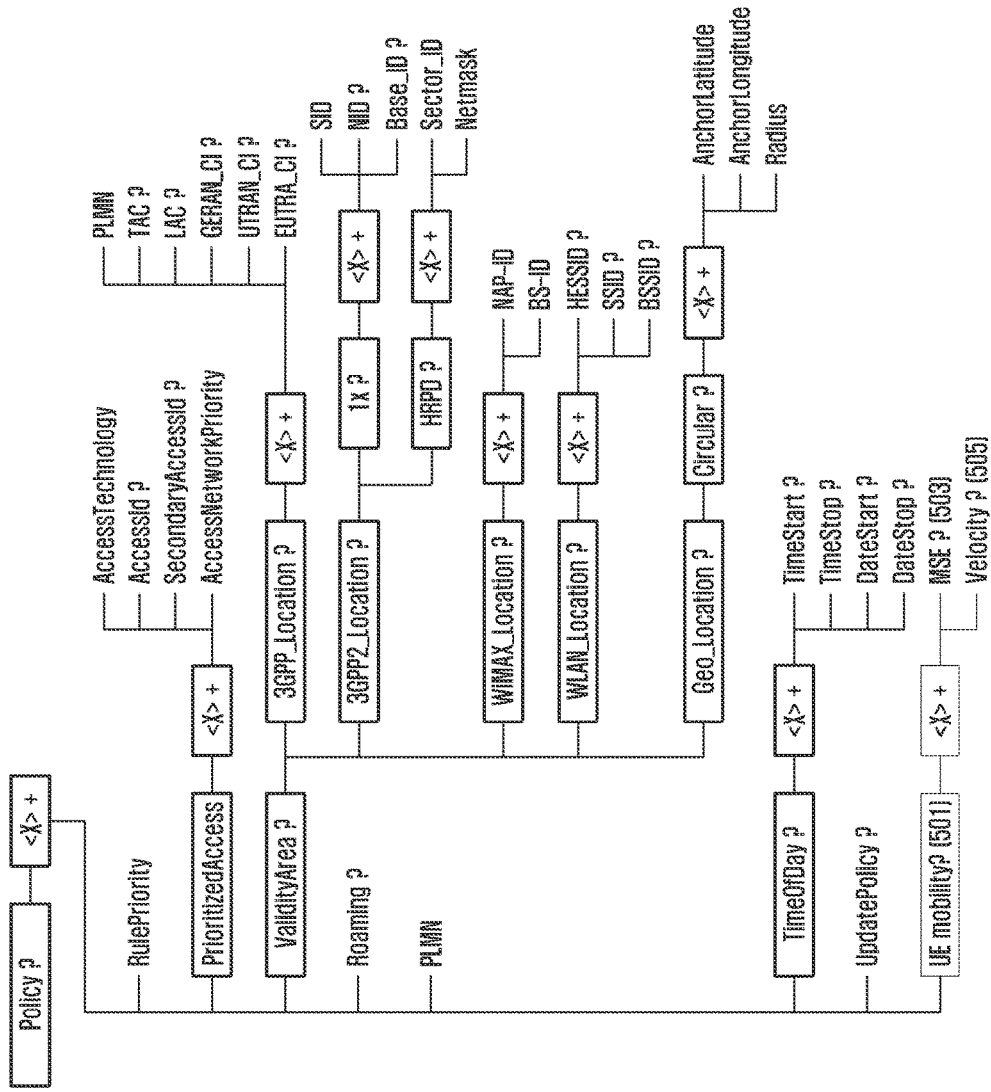
FIG. 5 is a diagram illustrating an example of an ANDSF policy including a moving velocity of user equipment in accordance with an embodiment of this disclosure.

The above-mentioned MSE information or moving velocity value may be further contained, in the form as shown in FIG. 5, in the ANDSF policy defined in 3GPP standard 24.312. FIG. 5 is a diagram illustrating an example of an ANDSF policy including a moving velocity of user equipment in accordance with an embodiment of this disclosure. Referring to FIG. 5, if a mobility value 501 is contained in the ANDSF policy, at least one of an MSE value 503 and a moving velocity value 505 may be contained.

In case the mobility value 501 is contained, at step 421, the UE 401 may determine whether a current moving velocity of the UE 401 is not more than/under the received information.

If a current moving velocity of the UE 401 is above or not less than the received policy value at step 423, the UE 401 may not access WLAN at step 425 due to a strong possibility of disconnection in case of access to WLAN. Additionally, in an embodiment, the UE 401 may maintain an access state with cellular network without discovering available WLAN APs 403.

However, if a current moving velocity of the UE 401 is not more than or under the received policy value at step 431, the UE 401 starts a discovery of the neighboring WLAN APs 403 at step 433 so as to determine whether there is an available WLAN AP 403 in the neighborhood. Discovery techniques for WLAN AP 403 may be a passive scanning technique and an active scanning technique, as follows.

Passive Scanning Technique: UE receives all messages from respective WLAN operating channels and then obtains beacon messages transmitted by neighboring WLAN APs. In this manner, neighboring WLAN APs can be found.

Active Scanning Technique: UE sends, to respective WLAN operating channels, a probe request message inquiring about the existence of neighboring WLAN APs and then receives a probe response message. In this manner, neighboring WLAN APs can be found.

When a WLAN signal (i.e., the above-mentioned beacon message or probe response message) is received from the WLAN AP 403 at step 435 using the passive or active scanning technique, the UE 401 performs a procedure for WLAN access to the AP 403 at step 437 and then transmits or receives data through the WLAN AP 403 at step 439.

Figure 6:
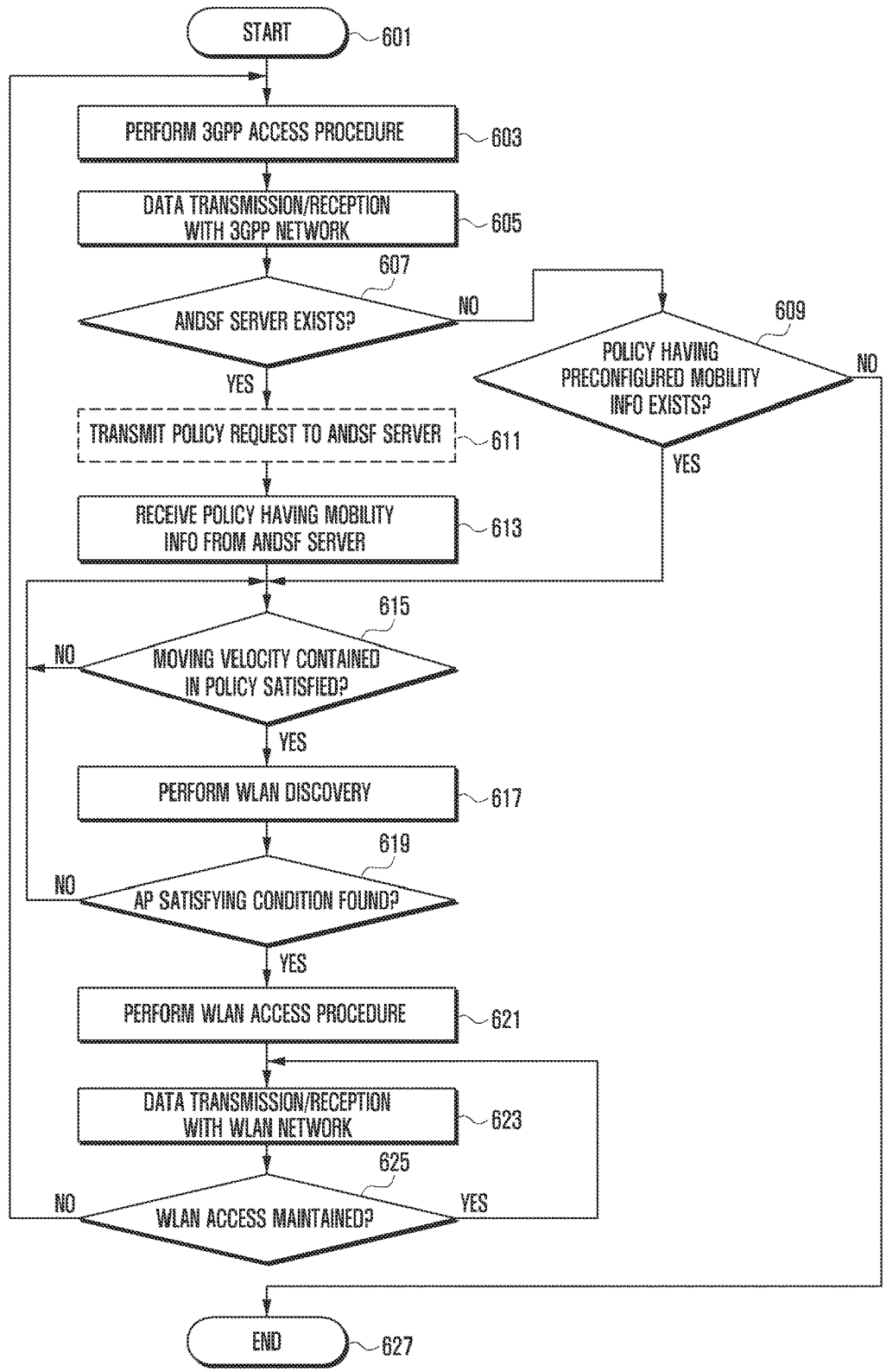
FIG. 6 is a diagram illustrating an operating process of user equipment regarding a scheme of performing access to WLAN network depending on a moving velocity of user equipment in accordance with an embodiment of this disclosure.

FIG. 6 is a diagram illustrating an operating process of user equipment regarding a scheme of performing access to WLAN network depending on a moving velocity of user equipment in accordance with an embodiment of this disclosure.

Referring to FIG. 6, at step 603, UE performs a procedure for access to ENB of 3GPP network and enters a state capable of transmitting or receiving data to or from 3GPP network. Thereafter, at step 605, the UE can transmit or receive data to or from 3GPP network through the ENB.

Meanwhile, at step 607, the UE determines whether there is an ANDSF server in 3GPP network. At this step, the UE may check whether information associated with the ANDSF server is stored therein in advance.

In case there is an ANDSF function in the network, the UE may transmit a message of requesting ANDSF related policies to the ANDSF server at step 611. Then, at step 613, the UE may receive an ANDSF policy from the ANDSF server. Meanwhile, in an embodiment disclosed herein, the ANDSF policy may include a policy associated with UE mobility.

If there is no ANDSF function in the network, the UE determines at step 609 whether any policy having preconfigured mobility information is stored therein. If there is no policy, the UE ends this process at step 627.

If the UE receives an ANDSF policy from the ANDSF server or if the UE has therein a preconfigured ANDSF policy, the UE determines at step 615 whether a current moving velocity of the UE satisfies a moving velocity contained in the ANDSF policy.

If a current moving velocity of the UE is not more than or under the received policy value, the UE 401 starts a discovery of neighboring WLAN APs at step 617 so as to determine whether there is an available WLAN AP in the neighborhood. Discovery techniques for WLAN AP may be a passive scanning technique and an active scanning technique, as follows.

Passive Scanning Technique: UE receives all messages from respective WLAN operating channels and then obtains beacon messages transmitted by neighboring WLAN APs. In this manner, neighboring WLAN APs can be found.

Active Scanning Technique: UE sends, to respective WLAN operating channels, a probe request message inquiring about the existence of neighboring WLAN APs and then receives a probe response message. In this manner, neighboring WLAN APs can be found.

At step 619, using the above-mentioned passive or active scanning technique, the UE determines whether any WLAN AP satisfying the condition is found. If such a WLAN AP is found, the UE performs a procedure for WLAN access to the AP at step 621 and then transmits or receives data through the WLAN AP at step 623.

Thereafter, if it is not possible for the UE to maintain access to the WLAN AP at step 625 for reasons of lowering strength of a signal from the WLAN AP, the UE performs again a procedure for access to 3GPP network at step 603 and then performs data transmission and reception with 3GPP network at step 605.

Figure 7:
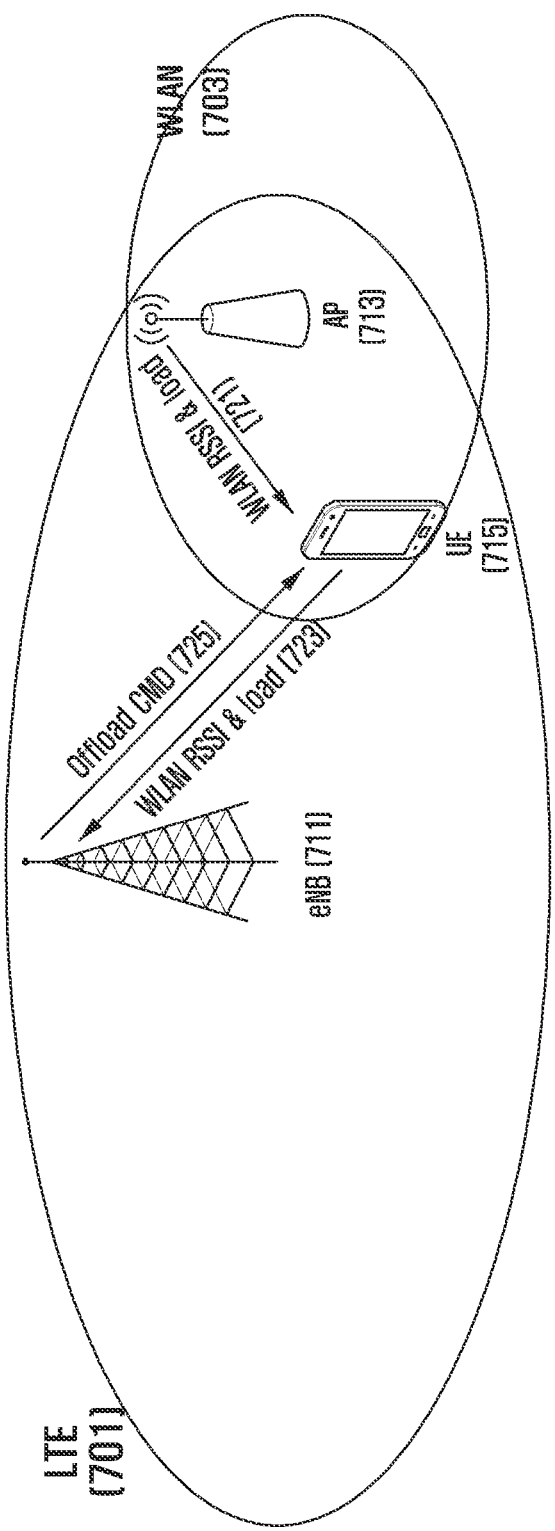
FIG. 7 is a diagram illustrating the second scenario of network interworking between 3GPP network and WLAN network in accordance with an embodiment of this disclosure.

FIG. 7 is a diagram illustrating the second scenario of network interworking between 3GPP network and WLAN network in accordance with an embodiment of this disclosure.

Referring to FIG. 7, contrary to the FIG. 3 scenario for receiving an ANDSF policy from the network and allowing UE to determine a network selection, in this scenario the UE 715 collects (721) information about neighboring WLAN APs 713 and reports (723) it to ENB 711. Then the ENB 711 determines a network selection and sends a command 725 to the specific UE 715. When collecting WLAN AP information, the UE 715 may collect information about signal strength and load of the neighboring WLAN AP 713 and transmit it to the ENB 711.

Meanwhile, in various scenarios as shown in FIGS. 3 and 7, the network may transmit a message related to WLAN offload to specific UE so as to move such specific UE to WLAN rather than all UEs in a cell. For example, in case most traffic is formed by some specific UEs only from among UEs connected with the ENB 771, the WLAN offload of such UEs only can reduce significantly the load of cellular ENB. The following description is applied to a case in which specific UEs are offloaded to WLAN in each scenario shown in FIGS. 3 and 7.

Figure 8:
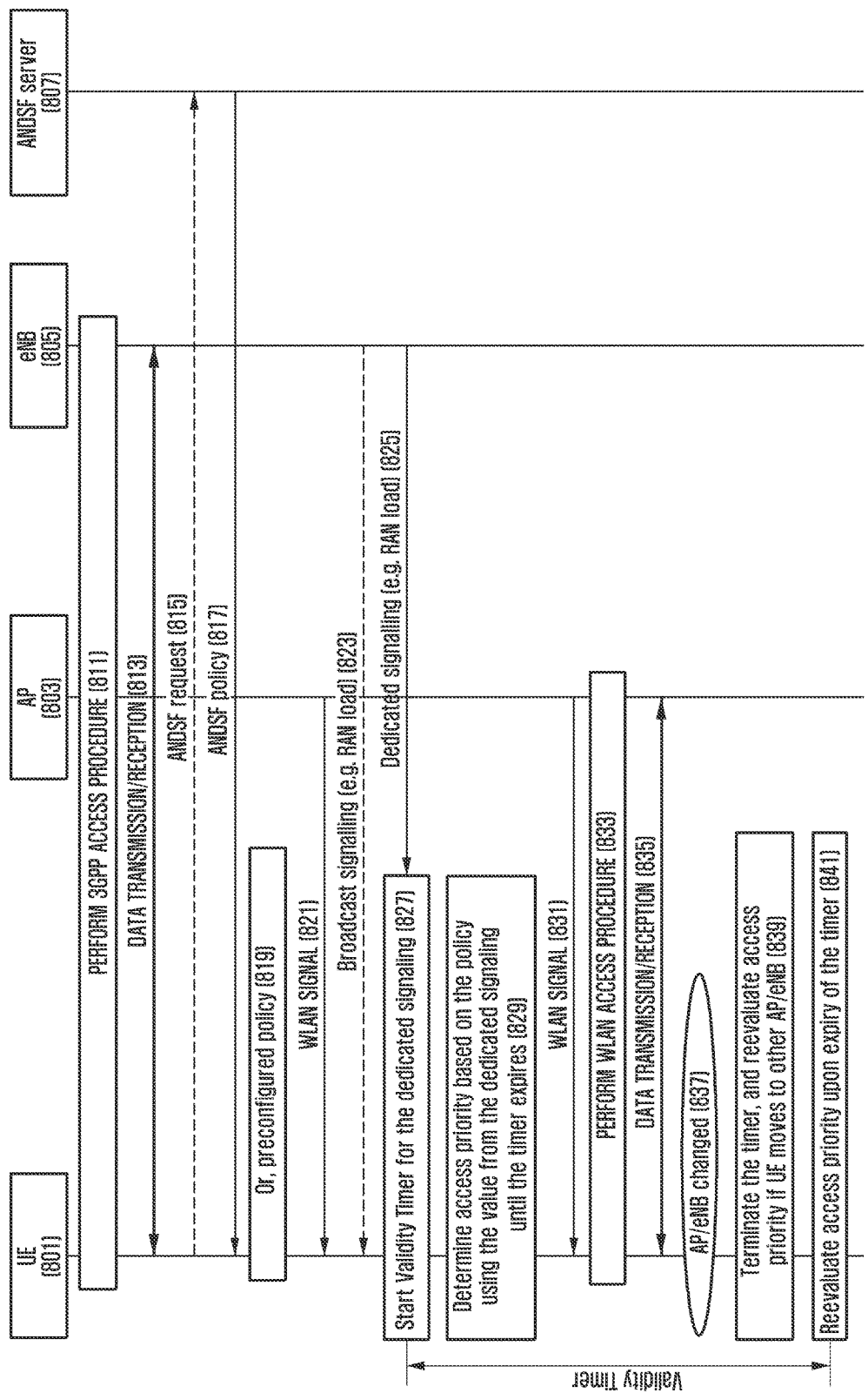
FIG. 8 is a diagram illustrating a message flow regarding a scheme of offloading specific user equipment only to WLAN network in accordance with the first embodiment of this disclosure.

FIG. 8 is a diagram illustrating a message flow regarding a scheme of offloading specific user equipment only to WLAN network in accordance with the first embodiment of this disclosure. This may be applied to the FIG. 3 scenario.

Referring to FIG. 8, at step 811, UE 801 performs a procedure for access to ENB 805 of 3GPP network and enters a state capable of transmitting or receiving data to or from 3GPP network.

Thereafter, at step 813, the UE 801 can transmit or receive data to or from 3GPP network through the ENB 805.

Meanwhile, in case there is an ANDSF function in the network, the UE 801 may transmit a message of requesting ANDSF related policies to an ANDSF server 807 at step 815. Then, at step 817, the ANDSF server 807 may transmit an ANDSF policy to the UE 801.

Alternatively, the ANDSF server may transmit such an ANDSF policy to the UE without a request of the UE. If there is no ANDSF function in the network, there may be a preconfigured ANDSF policy in the UE 801 as shown at step 819. In an embodiment, steps 815 and 817 may be performed optionally.

An example of the ANDSF policy is as follows.

Example: In case UE accesses 3GPP network of operator A, and in case current load information of ENB is 'medium' or more, increase access priority of a WLAN AP having a WLAN identifier 'AAAA'.

Additionally, in an embodiment, it is possible to determine at least one of an access network selection and a traffic steering policy on the basis of information other than current load information of ENB. In the following embodiment, information used for determining at least one of an access network selection and a traffic steering policy may be referred collectively to as load information of ENB.

As the above-mentioned WLAN identifier, a service set identifier (SSID) capable of being defined for each WLAN AP may be used.

Thereafter, at step 821 or 831, the UE 801 may receive signals of neighboring WLAN APs 803 through a WLAN AP discovery. Discovery techniques for WLAN APs may be a passive scanning technique and an active scanning technique, as follows.

Passive Scanning Technique: UE receives all messages from respective WLAN operating channels and then obtains beacon messages transmitted by neighboring WLAN APs. In this manner, neighboring WLAN APs can be found.

Active Scanning Technique: UE sends, to respective WLAN operating channels, a probe request message inquiring about the existence of neighboring WLAN APs and then receives a probe response message. In this manner, neighboring WLAN APs can be found.

Meanwhile, in case of a condition defining that current load information of ENB is 'medium' or more, as shown in the above example policy, each individual ENB 805 may transmit its own current load information via broadcast at step 823 or via unicast at step 825.

If the ENB 805 sends its own load information via broadcast at step 823, all UEs in a cell can receive and utilize a broadcast transmission message. This example supposes that current load information of ENB is transmitted as 'low'. According to an embodiment, the broadcast transmission message may be sent through a system information block (SIB) message of the RRC layer. Also, in an embodiment, information used for ENB to determine at least one of an access network selection and a traffic steering policy may include at least one of WLAN channel utilization, a WLAN downlink backhaul rate, a WLAN uplink backhaul rate, a received channel power indicator (RCPI) of WLAN, a received signal to noise indicator (RSNI) of WLAN, information associated with reference signal receive power (RSRP) of ENB, and information associated with reference signal received quality of ENB. For example, it is possible to deliver information associated with a threshold value of one of the above kinds of information and then, based on the threshold value, select an access network or perform a traffic steering. Specifically, if measured information exceeds a threshold value as the result of comparison between information received from ENB by UE and information measured by UE, it is possible to select, as an access network, at least one of ENB and WLAN or perform a traffic steering.

Additionally, in an embodiment, the above-mentioned WLAN channel utilization may include load-related information of WLAN.

Meanwhile, in order for the ENB 805 to offload specific UE 801 only to WLAN at step 825, it may be supposed that a current load state of the ENB is transmitted as 'high' to the UE 801 via unicast. According to an embodiment, this unicast message may be transmitted through a message of the RRC layer. This RRC layer message may include an RRCConnectionReconfiguration message. If the UE 801 receives both a broadcast transmission message and a unicast transmission message, the UE 801 may use the unicast message prior to the broadcast message. Namely, although the UE 801 receives low and high load states of the ENB 805 in this example, the UE 801 may determine, based on the unicast message, that the load state of the ENB 805 is 'high'. Specifically, if the UE receives both broadcast transmission information and unicast transmission information and if the unicast transmission information is not released, the UE may select an access network or perform a traffic steering on the basis of the unicast transmission information. Also, in case the UE receives repeatedly such unicast information, the UE may apply the latter-received information and release the former-received information.

Meanwhile, in order to determine whether information received via unicast is valid, an embodiment may introduce a validity timer. When a unicast message is received, the UE 801 may determine that information received via unicast is valid until the expiry of the validity timer. Additionally, after the expiry of the validity timer, the UE 801 determines that information received via unicast is not valid any more. Also, in this case, the UE may discard information received via unicast.

Namely, at step 827, the UE 801 may start the timer. Then the UE 801 may determine that load information of dedicated signaling is valid until the expiry of the timer. Additionally, depending on embodiments, the timer may be started at a time point when timer related information is received, when the UE 801 accesses the WLAN AP 803, or when the UE enters an RRC idle state.

Namely, at step 829, in case the validity timer runs, the UE 801 recognizes that the load state of the ENB 805, received via unicast, is 'high', and then determines access by determining whether there is a network having higher priority satisfying the above-mentioned ANDSF policy. If the timer expires, the UE 801 determines that the received information indicating a high load state of the ENB 805 is not valid any more. In case there is information received via broadcast as shown in this embodiment, the UE determines access at step 841 by determining, based on the received broadcast information, whether there is a network having higher priority satisfying the above-mentioned ANDSF policy. Namely, the UE recognizes that the load state of the ENB 805 is 'low', and then determines access by determining whether there is a network having higher priority satisfying the above-mentioned ANDSF policy. Meanwhile, contrary to this embodiment, if there is no broadcast information and there is only information received via unicast, and if the timer expires, the UE 801 may determine that there is no valid load information of the ENB 805, and then determine access by determining whether there is a network having higher priority satisfying the above-mentioned ANDSF policy.

If any WLAN network having higher access priority exists considering the ANDSF policy from a value received through the unicast or broadcast message, the UE 801 receives signals from neighboring WLAN APs 803 by using the above-mentioned passive or active scanning technique at step 831. If there is a WLAN AP satisfying the condition, the UE 801 performs a procedure for WLAN access to such a WLAN AP at step 833. Then, at step 835, the UE 801 may perform data transmission or reception with the accessed WLAN AP 803.

In an embodiment, after a successful access with the WLAN AP 803, the UE 801 does not perform data transmission and reception with 3GPP network. However, in order to receive an incoming call or the like, the UE 801 may enter an idle state and periodically receive a paging message or the like.

Meanwhile, for reasons of the movement of the UE 801 or the like, a certain case in which the UE 801 moves from the current ENB 805 of 3GPP network to other ENB or in which the UE 801 changes access to other WLAN AP 803 may be further considered.

If the UE 801 moves from the current ENB of 3GPP network to other ENB at step 837, the UE 801 may have a possibility of using again a service through 3GPP network since the latter ENB is different in load state and volume from the former ENB.

Therefore, if the validity timer is running when the UE 801 moves from the current ENB of 3GPP network to other ENB or changes access to other WLAN AP, at step 839 the UE 801 terminates the validity timer and determines that information received via unicast is not valid any more. Then the UE 801 determines access by determining again whether there is a network having higher priority satisfying the above-mentioned ANDSF policy. Through this method, the UE can determine promptly a network to be accessed in case of a cell change, and this may improve user satisfaction.

In an embodiment, a value related to the timer may be offered to the UE 801 through one or more of steps 811 and 825. Alternatively, a value preconfigured in the UE 801 may be used. Such a value related to the timer may include a time value of the timer.

Figure 9:
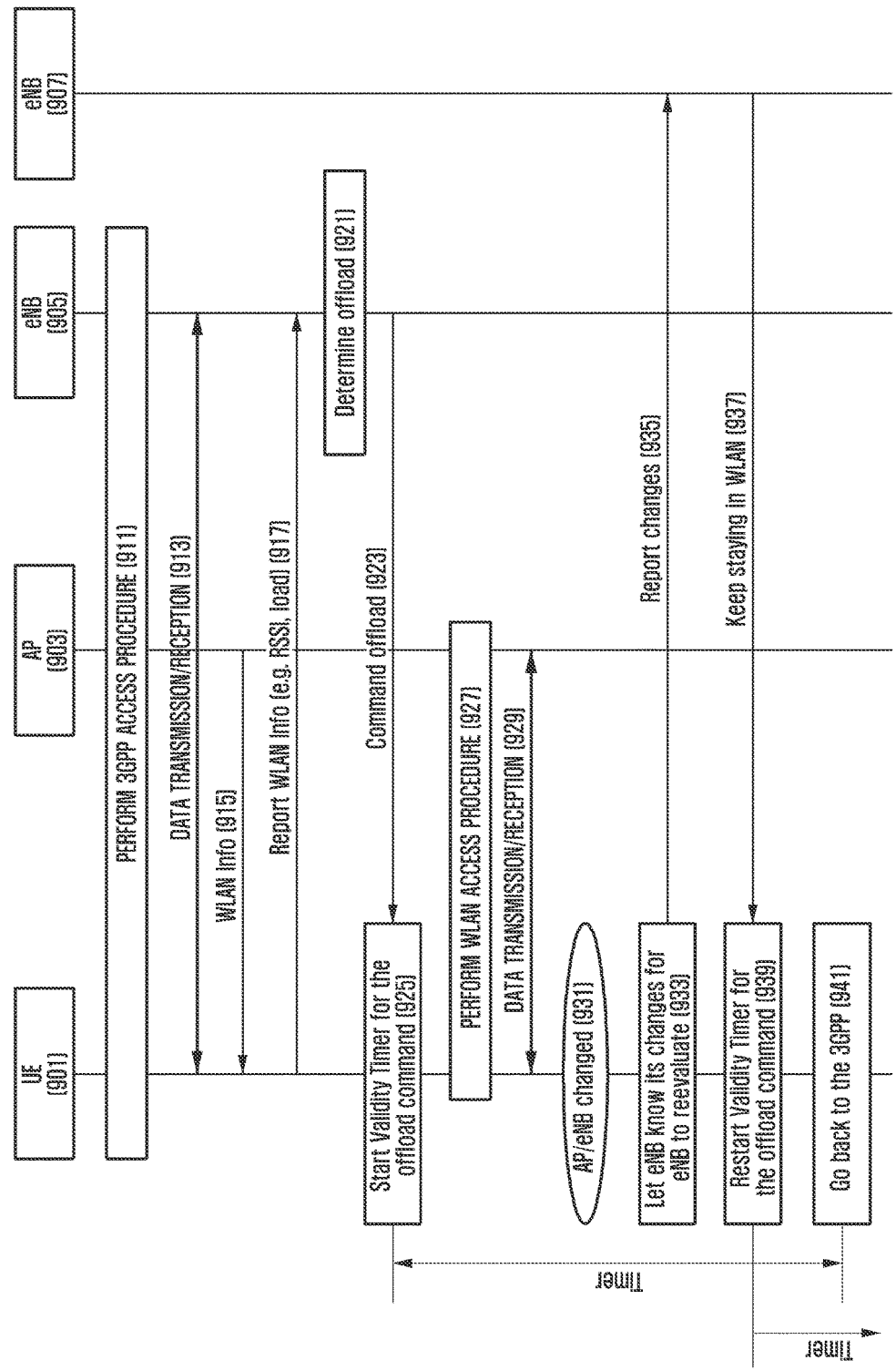
FIG. 9 is a diagram illustrating a message flow regarding a scheme of offloading specific user equipment only to WLAN network in accordance with the second embodiment of this disclosure.

FIG. 9 is a diagram illustrating a message flow regarding a scheme of offloading specific user equipment only to WLAN network in accordance with the second embodiment of this disclosure. This may be applied to the FIG. 7 scenario.

Referring to FIG. 9, at step 911, UE 901 performs a procedure for access to ENB 905 of 3GPP network and enters a state capable of transmitting or receiving data to or from 3GPP network. Thereafter, at step 913, the UE 901 can transmit or receive data to or from 3GPP network through the ENB 905.

Thereafter, at step 915, the UE 901 receives signals from neighboring WLAN APs 903 by using the above-mentioned passive or active scanning technique so as to check whether there is a suitable WLAN AP 903 for offload in the neighborhood. This signal may be a beacon message or a probe response message received from the WLAN AP 903.

If the UE 901 finds any WLAN AP suitable for offload, the UE 901 reports relevant information to the ENB 905 at step 917. A report message may use a MeasurementReport message of RRC layer and may contain one or more of signal strength and load information of the WLAN AP 903. Such signal strength and load information of the WLAN AP 903 may be obtained through the above-mentioned beacon message or probe response message.

At step 921, the ENB 905 that receives information about the neighboring WLAN AP 903 from the UE 901 may determine, based on the received information, whether to offload the UE 901 to the reported WLAN AP 903. Additionally, in some embodiments, the ENB 905 may determine whether to offload the UE 901 to the reported WLAN AP 903, further considering one or more of a current load state of the ENB 905 and the quantity of traffic produced by the UE 901.

If it is determined to offload the UE 901 to the WLAN AP 903, the ENB 905 transmits an offload command to one of the WLAN APs 903, or some candidates thereof, reported to the UE 901 at step 923. In some embodiments, the offload command may use a message of RRC layer.

Meanwhile, when the UE 901 receives the offload command message from the ENB 905, the UE 902 starts at step 925 a timer for determining whether the command is valid. A value related to the timer may be offered to the UE 901 at steps 923 and 911. This value may include a timer time value. Specifically, at step 921, the ENB 905 may determine a timer time value, based on the reported information, and then offer it to the UE 901.

If the validity timer expires, the UE 901 determines at step 941 that the offload command is not valid any more, and then tries to return to 3GPP network.

At step 927, the UE 901 that receives the offload command message performs a WLAN access procedure to one of the WLAN APs 903 specified in the command message.

Thereafter, in case of succeeding in the WLAN access procedure, the UE 901 may perform data communication with the WLAN AP 903 at step 929.

Otherwise, in case of failing in the WLAN access procedure, the UE 901 may perform again the WLAN access procedure to another AP specified in the command message at step 927.

In case of all failures, the UE 901 terminates the validity timer and tries to return to 3GPP network at step 941.

Depending on embodiments, the ENB 905 may offer a message for instructing a return to 3GPP network to the UE. This message may be transmitted through paging.

Meanwhile, for reasons of the movement of the UE 901 or the like, a certain case in which the UE 901 moves from the current ENB of 3GPP network to other ENB or in which the UE 901 changes access to other WLAN AP may be further considered.

If the UE 901 moves from the current ENB 905 of 3GPP network to other ENB 907 at step 931, the UE 901 may have a possibility of using again a service through 3GPP network since the latter ENB 907 is different in load state and volume from the former ENB 905.

Therefore, at step 935, the UE 901 may report such changes to the new ENB 907. Depending on embodiments, a report message may use a message of RRC layer and contain therein one or more of a 3GPP network change state and a WLAN AP change state (including signal strength and load information of WLAN AP).

The new ENB 907 that receives the reported changes may determine again whether to offload, and then, as discussed at step 923, transmit an offload command or a message of command to return to 3GPP network to the UE 901.

Meanwhile, at step 937, the new ENB 907 may manage a state in which the specific UE 901 is offloaded in WLAN, and may also transmit, to the UE 901, a message of command to keep staying in WLAN such that the UE 901 may not return to 3GPP network. If the UE 901 receives the command message from the new ENB 907 and if the timer has already operated, the UE 901 restarts the validity timer to extend the timer at step 939.

Figure 10:
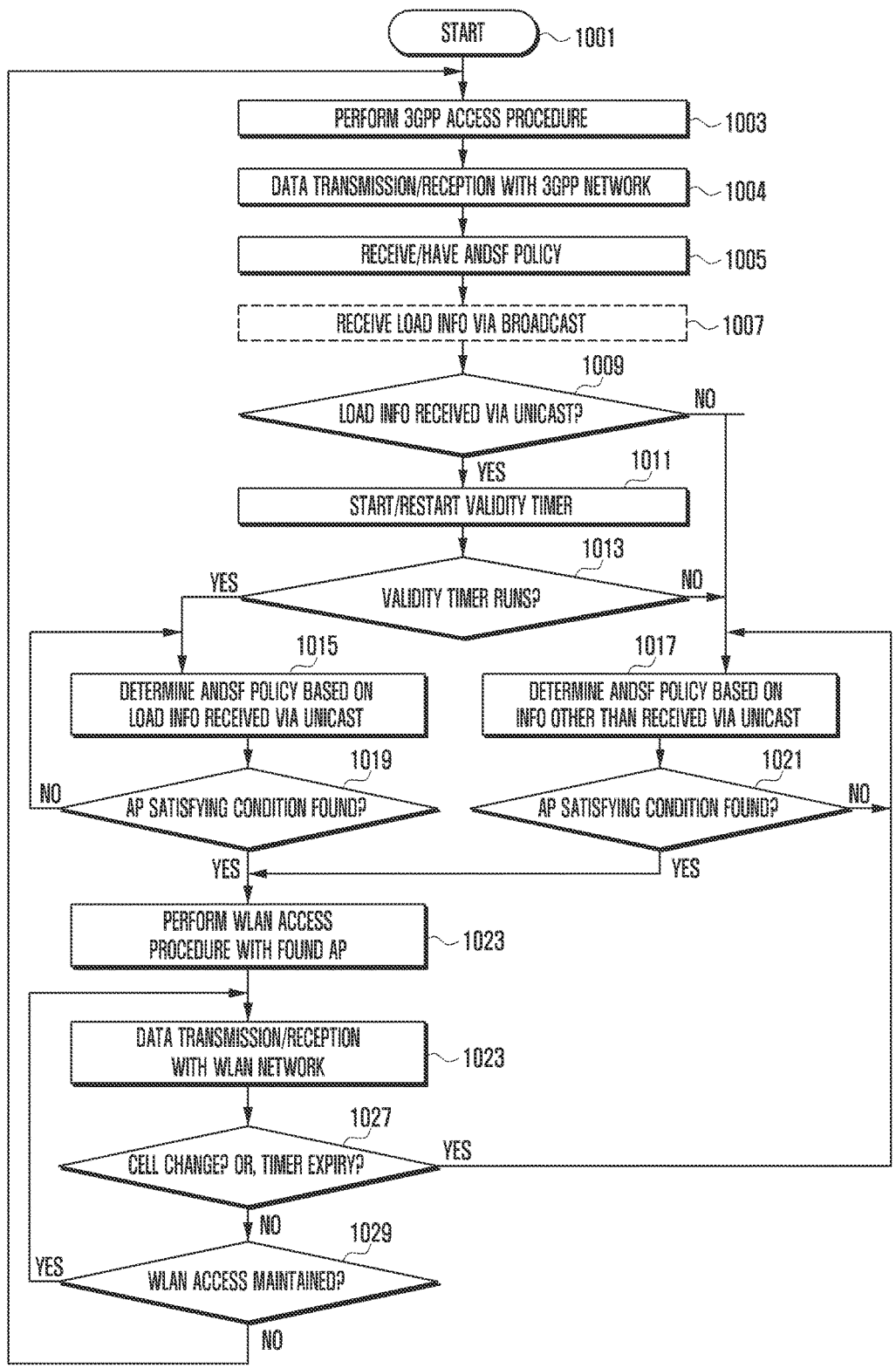
FIG. 10 is a diagram illustrating an operating process of user equipment regarding a scheme of offloading specific user equipment only to WLAN network in accordance with the first embodiment of this disclosure.

FIG. 10 is a diagram illustrating an operating process of user equipment regarding a scheme of offloading specific user equipment only to WLAN network in accordance with the first embodiment of this disclosure.

Referring to FIG. 10, at step 1003, UE performs a procedure for access to ENB of 3GPP network and enters a state capable of transmitting or receiving data to or from 3GPP network. Thereafter, at step 1004, the UE can transmit or receive data to or from 3GPP network through the ENB.

Thereafter, at step 1005, the UE receives an ANDSF policy from the network or checks a preconfigured ANDSF policy. Specifically, in case there is an ANDSF function in the network, the UE may transmit a message of requesting ANDSF related policies to an ANDSF server. Then the ANDSF server may transmit an ANDSF policy to the UE. Alternatively, the ANDSF server may transmit such an ANDSF policy to the UE without a request of the UE. If there is no ANDSF function in the network, there may be a preconfigured ANDSF policy in the UE.

An example of the ANDSF policy is as follows. Example: In case UE accesses 3GPP network of operator A, and in case current load information of ENB is 'medium' or more, increase access priority of a WLAN AP having a WLAN identifier 'AAAA'.

The WLAN identifier may use SSID or the like.

Meanwhile, in case of a condition defining that current load information of ENB is 'medium' or more, as shown in the above example policy, the UE may receive current load information of the ENB via broadcast at step 1007 or via unicast at step 1009.

If the UE receives the unicast load information at step 1009, the UE starts the validity timer at step 1011. The timing of starting the timer may be started at a time point when timer related information is received, when the UE applies access technique according to the load information, or when the UE enters an RRC idle state.

If the validity timer runs or if the UE receives load information via unicast and is in an RRC CONNECTED state, the UE determines at step 1015 that information received as the unicast message is valid, and also determines an ANDSF policy by using the received information. Namely, when the UE determines whether to access which network (e.g., 3GPP network or WLAN network), the UE selects a network satisfying the ANDSF policy by utilizing information received via unicast.

However, if the validity timer fails to run, the UE determines at step 1017 that information received via unicast is not valid any more, and then determines an ANDSF policy by using any information other than the information received via unicast. Namely, if there is information received via broadcast, the UE utilizes this information. If there is no information received, the UE may perform the determination of ANDSF policy without any information received from the ENB.

Thereafter, if any WLAN network having higher access priority exists considering the ANDSF policy from a value received through the unicast or broadcast message at step 1019 or 1021, the UE receives signals from neighboring WLAN APs by using the above-mentioned passive or active scanning technique. If there is a WLAN AP satisfying the condition, the UE performs a procedure for WLAN access to such a WLAN AP at step 1023.

Then, at step 1025, the UE may perform data transmission or reception with the accessed WLAN AP. After a successful access with the WLAN AP, the UE does not perform data transmission and reception with 3GPP network. However, in order to receive an incoming call or the like, the UE may enter an idle state and periodically receive a paging message or the like.

Meanwhile, for reasons of the movement of the UE or the like, a certain case in which the UE moves from the current ENB of 3GPP network to other ENB or in which the UE changes access to other WLAN AP may be further considered.

If the UE moves from the current ENB of 3GPP network to other ENB, the UE may have a possibility of using again a service through 3GPP network since the latter ENB is different in load state and volume from the former ENB. Therefore, if the UE moves from the current ENB of 3GPP network to other ENB, or if the UE changes access to other WLAN AP, or if the validity timer expires at step 1027, the UE terminates the validity timer at step 1017, determines that information received via unicast is not valid any more, and then determines an ANDSF policy by using any information other than the information received via unicast. Otherwise, the UE continuously determines at step 1029 whether it is possible to maintain WLAN access. If not possible, the UE tries to return to 3GPP network at step 1003.

Through this method, the UE can determine promptly a network to be accessed in case of a cell change, and this may improve user satisfaction.

Figure 11:
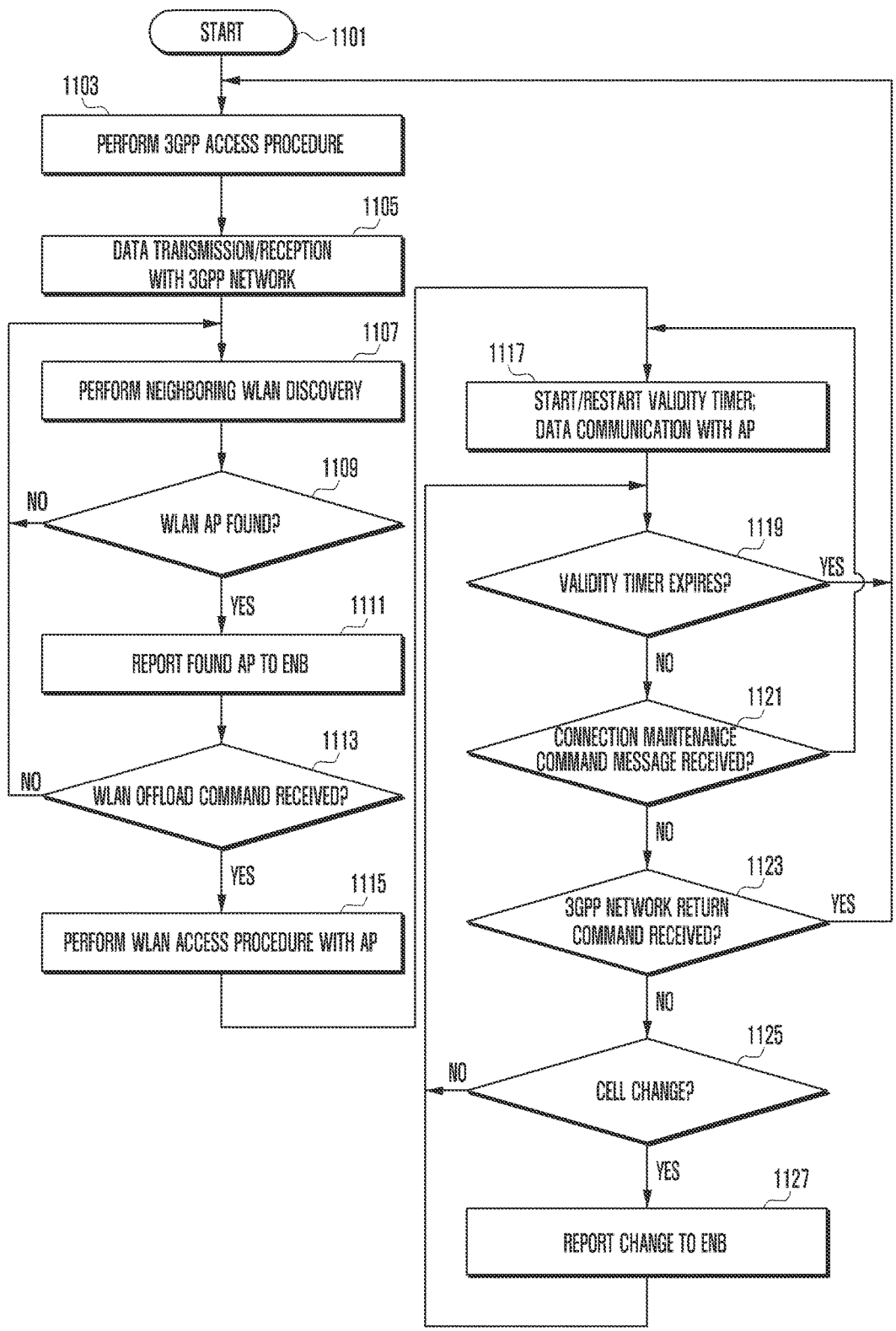
FIG. 11 is a diagram illustrating an operating process of user equipment regarding a scheme of offloading specific user equipment only to WLAN network in accordance with the second embodiment of this disclosure.

FIG. 11 is a diagram illustrating an operating process of user equipment regarding a scheme of offloading specific user equipment only to WLAN network in accordance with the second embodiment of this disclosure.

Referring to FIG. 11, at step 1103, UE performs a procedure for access to ENB of 3GPP network and enters a state capable of transmitting or receiving data to or from 3GPP network. Thereafter, at step 1105, the UE can transmit or receive data to or from 3GPP network through the ENB.

Thereafter, at step 1107, the UE performs a WLAN discovery so as to find neighboring WLAN APs.

If the UE finds any WLAN AP through the WLAN discovery procedure at step 1109, the UE reports the found WLAN AP to the ENB at step 1111.

Thereafter, when the UE receives an offload command message from the ENB at step 1113, the UE performs a WLAN access procedure to the relevant AP in response to the offload command at step 1115. If there is two or more WLAN APs in the offload command message, the UE performs a WLAN AP access procedure according to priorities specified in the message. If an access procedure to a certain WLAN AP fails, the UE tries to access in order the other WLAN APs specified in the offload command message.

In case of succeeding in the WLAN AP access procedure, the UE starts the validity timer and performs data communication with the AP at step 1117. Thereafter, if the validity timer expires, the UE tries to return to 3GPP network at step 1103. If the validity timer does not expire and a connection maintenance command message is received from the ENB at step 1121, the UE may restart the validity timer and also maintain data communication with the AP at step 1117. Meanwhile, if a message of command to return to 3GPP network is received from the ENB at step 1123, the UE tries to access 3GPP network in response to this command at step 1103.

Additionally, if a cell change in 3GPP network or a change between WLAN APs occurs at step 1125 while the UE accesses WLAN, the UE reports such a change to the ENB at step 1127 such that the ENB can take a prompt action.

Figure 12:
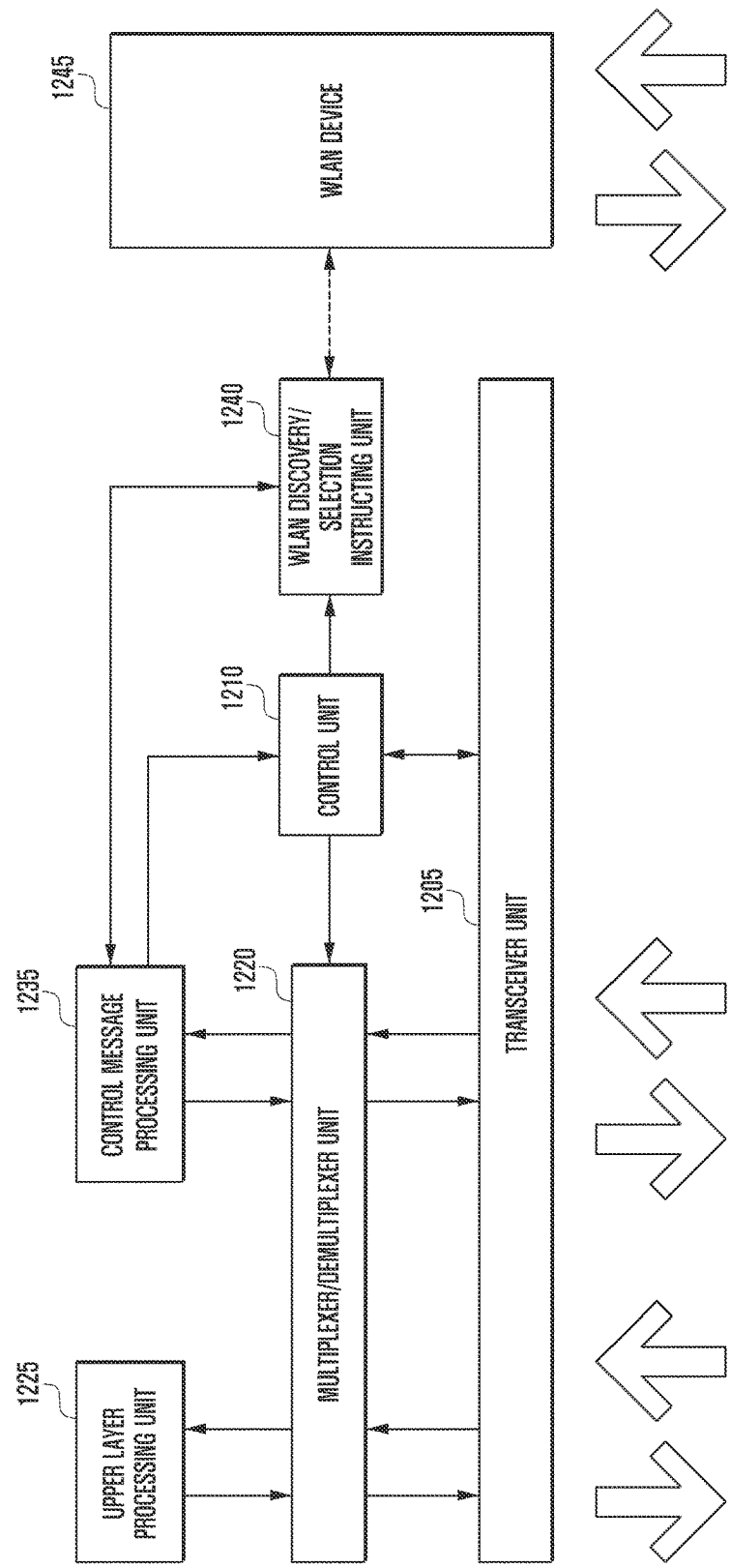
FIG. 12 is a block diagram illustrating a configuration of user equipment in accordance with an embodiment of this disclosure.

FIG. 12 is a block diagram illustrating a configuration of user equipment (UE) in accordance with an embodiment of this disclosure.

Referring to FIG. 12, the UE according to an embodiment of this invention includes a transceiver unit 1205, a control unit 1210, a multiplexer/demultiplexer unit 1215, a control message processing unit 1230, and an upper layer processing unit 1220.

The transceiver unit 1205 receives data and control signals through a forward channel of a serving cell and transmits data and control signals through a backward channel. In case a plurality of serving cells are set, the transceiver unit 1205 performs transmission and reception of data and control signals through the plurality of serving cells.

The multiplexer/demultiplexer unit 1215 multiplexes data generated at the upper layer processing unit 1220 or the control message processing unit 1230, or demultiplexes data received at the transceiver unit 1205 and then delivers them to the upper layer processing unit 1220 or the control message processing unit 1230.

The control message processing unit 1230 processes a control message received from ENB and then takes a suitable action. For example, if DRX-related parameters are received, the control message processing unit 1230 transfers these parameters to the control unit.

The upper layer processing unit 1220 may be configured for each service. The upper layer processing unit 1220 processes data generated in a user service such as FTP (File Transfer Protocol) or VoIP (Voice over Internet Protocol) and then transfers them to the multiplexer/demultiplexer unit 1215, or processes data received from the multiplexer/demultiplexer unit 1215 and then transfers them to a service application on the upper layer.

The control unit 1210 checks a scheduling command, e.g., backward grants, received through the transceiver unit 1205 and thereby controls the transceiver unit 1205 and the multiplexer/demultiplexer unit 1215 such that backward transmission can be performed with a suitable transmission resource at a suitable time point. Also, the control unit controls the transceiver unit in connection with DRX operation and CSI/SRS transmission.

In this invention, the UE may further have a WLAN device 1245. In case there is a need for a WLAN discovery according to a policy/command received from the network or ENB, a WLAN discovery/selection instructing unit 1240, proposed in this invention, notifies the WLAN device 1245 to perform a discovery for neighboring WLAN APs.

Figure 13:
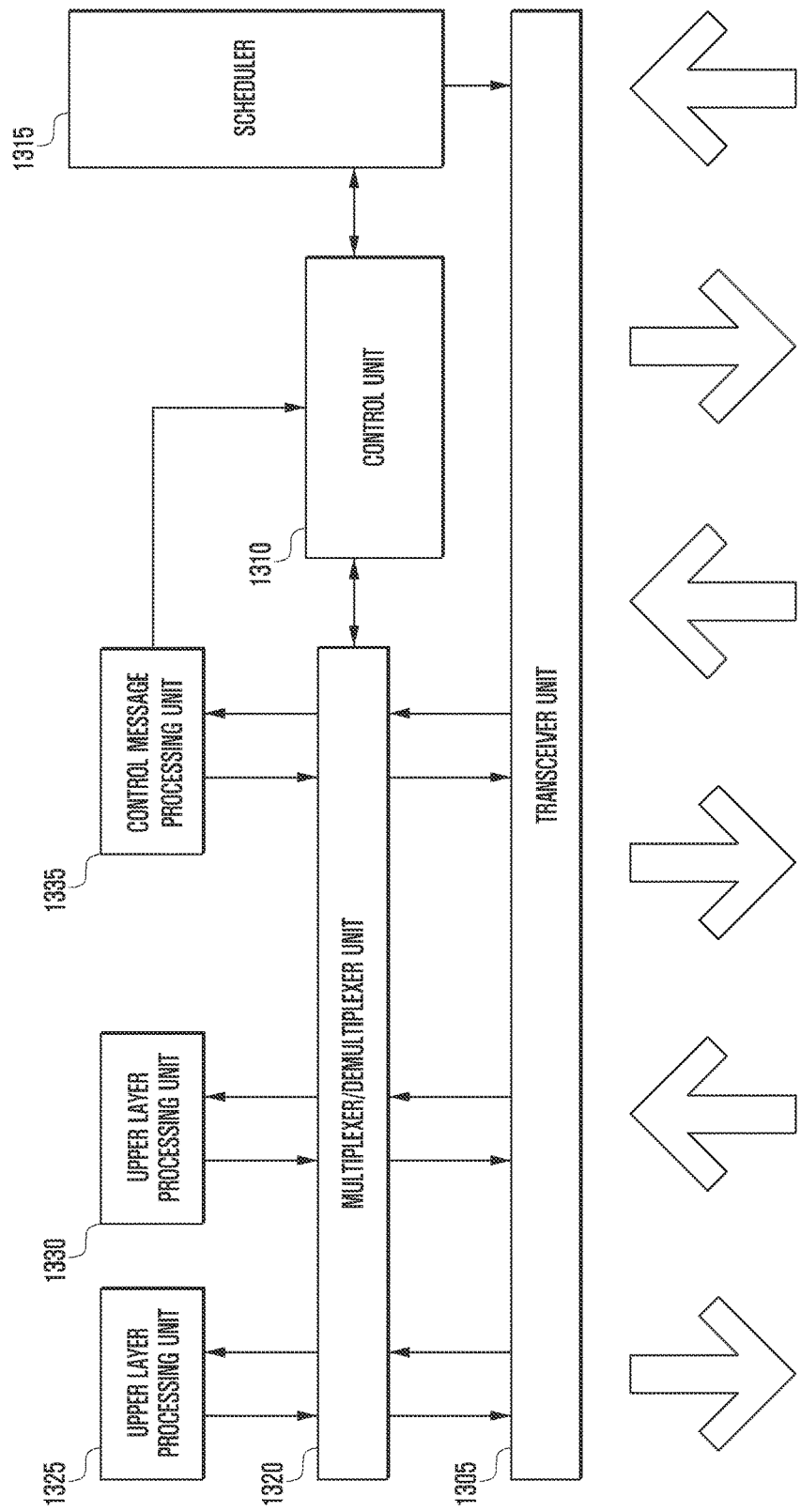
FIG. 13 is a block diagram illustrating a configuration of a base station in accordance with an embodiment of this disclosure.

FIG. 13 is a block diagram illustrating a configuration of a base station (ENB) in accordance with an embodiment of this disclosure.

The ENB shown in FIG. 13 includes a transceiver unit 1305, a control unit 1310, a multiplexer/demultiplexer unit 1320, a control message processing unit 1335, various upper layer processing units 1325 and 1330, and a scheduler 1315.

The transceiver unit 1305 transmits data and control signals through a forward carrier and receives data and control signals through a backward carrier. In case a plurality of carriers are set, the transceiver unit 1305 performs transmission and reception of data and control signals through the plurality of carriers.

The multiplexer/demultiplexer unit 1320 multiplexes data generated at the upper layer processing units 1325 and 1330 or the control message processing unit 1335, or demultiplexes data received at the transceiver unit 1305 and then delivers them to the upper layer processing units 1325 and 1330, the control message processing unit 1335, or the control unit 1310. The control message processing unit 1335 processes a control message transmitted from UE and then takes a suitable action, or creates a control message to be transmitted to the UE and delivers it to the lower layer.

The upper layer processing units 1325 and 1330, which may be configured for each service, process data generated in a user service such as FTP or VoIP and then transfer them to the multiplexer/demultiplexer unit 1320, or process data received from the multiplexer/demultiplexer unit 1320 and then transfers them to a service application on the upper layer.

The control unit 1310 determines when UE will transmit CSI/SRS, and thereby controls the transceiver unit.

The scheduler 1315 allocates transmission resources to UE at a suitable time point by considering a buffer state of UE, a channel status, an active time of UE, and the like, and thereby allows the transceiver unit to process signals received from UE or transmit signals to UE.

By using the proposed method, UE can reduce user's inconvenience and save battery by blocking unnecessary offloading and WLAN scanning, and also can improve the quality of use and immediately respond to a cell change by preventing a ping-pong phenomenon.

While this invention has been particularly shown and described with reference to an exemplary embodiment thereof, it will be understood by those skilled in the art that various changes in form and details may be made therein without departing from the spirit and scope of this invention as defined by the appended claims.

What is claimed is:

1. A method for operating a terminal in a communication system, the method comprising:
   receiving, from a base station, a system information block including first radio access network (RAN) assistance information;
   receiving, from the base station, a radio resource control (RRC) connection reconfiguration message including second RAN assistance information and a timer associated with the second RAN assistance information;
   identifying whether the timer associated with the second RAN assistance information expires;
   discarding the second RAN assistance information and applying the first RAN assistance information, in case that the timer associated with the second RAN assistance information expires;
   identifying whether cell reselection occurs in case that the timer associated with the second RAN assistance information does not expire; and
   stopping the timer associated with the second RAN assistance information based on the cell reselection occurring and applying the first RAN assistance information.

2. The method of claim 1, further comprising:
   applying, in case that the timer is not expired or not stopped, the second RAN assistance information in the RRC connection reconfiguration message.

3. The method of claim 1,
   wherein the timer is started upon the terminal entering an RRC idle state.

4. The method of claim 1, wherein the system information block is broadcasted from the base station.

5. The method of claim 1, further comprising:
   applying, in case that the second RAN assistance information is not included in the RRC connection reconfiguration message, the first RAN assistance information.

6. A terminal in a communication system, the terminal comprising:
   a transceiver; and
   at least one processor configured to:
      control the transceiver to receive, from a base station, a system information block including first radio access network (RAN) assistance information,
      control the transceiver to receive, from the base station, a radio resource control (RRC) connection reconfiguration message including second RAN assistance information and a timer associated with the second RAN assistance information,
      identify whether the timer associated with the second RAN assistance information expires,
      discard the second RAN assistance information and apply the first RAN assistance information, in case that the timer associated with the second RAN assistance information expires,
      identify whether cell reselection occurs in case that the timer associated with the second RAN assistance information does not expire, and
      stop the timer associated with the second RAN assistance information based on the cell reselection occurring and applying the first RAN assistance information.

7. The terminal of claim 6, wherein the at least one processor is further configured to:
   apply, in case that the timer is not expired or not stopped, the second RAN assistance information in the RRC connection reconfiguration message.

8. The terminal of claim 6, wherein the timer is started upon the terminal entering an RRC idle state.

9. The terminal of claim 6, wherein the system information block is broadcasted from the base station.

10. The terminal of claim 6, wherein the at least one processor is further configured to apply, in case that the second RAN assistance information is not included in the RRC connection reconfiguration message, the first RAN assistance information.

* * * * *